United States Patent
Pericin

(10) Patent No.: US 10,218,723 B2
(45) Date of Patent: Feb. 26, 2019

(54) SYSTEM AND METHOD FOR FAST AND SCALABLE FUNCTIONAL FILE CORRELATION

(71) Applicant: Reversing Labs Holding GmbH, Zurich (CH)

(72) Inventor: Tomislav Pericin, Sremska Mitrovica (RS)

(73) Assignee: Reversing Labs Holding GmbH, Zurich (CH)

(*) Notice: Subject to any disclaimer, the term of this patent is extended or adjusted under 35 U.S.C. 154(b) by 86 days.

(21) Appl. No.: 14/958,168

(22) Filed: Dec. 3, 2015

(65) Prior Publication Data

US 2016/0164900 A1   Jun. 9, 2016

Related U.S. Application Data

(60) Provisional application No. 62/088,119, filed on Dec. 5, 2014.

(51) Int. Cl.
*G06F 21/00* (2013.01)
*H04L 29/06* (2006.01)
(Continued)

(52) U.S. Cl.
CPC .... *H04L 63/1425* (2013.01); *G06F 17/30091* (2013.01); *G06F 21/565* (2013.01)

(58) Field of Classification Search
CPC .............. H04L 63/1425; G06F 21/565; G06F 17/30091
See application file for complete search history.

(56) References Cited

U.S. PATENT DOCUMENTS 8,302,193 B1 * 10/2012 Gardner ................ G06F 21/56
                                                  707/758
8,621,625 B1   12/2013 Bogard
(Continued)

FOREIGN PATENT DOCUMENTS

EP   1986120 A1 * 10/2008   ............. G06F 21/56
WO  2014032507 A1   3/2014

OTHER PUBLICATIONS

Adkins Frances, et al. "heuristic malware detection via basic blcok comparison", 2013 8th International Conference on Malicious and Unwanted Software: The Americas (Malware), IEEE, Oct. 22, 2013 (Oct. 22, 2013), pp. 11-18, XP032542750, DOI: 10.1109/MALWARE.2013.6703680 ISBN: 978-1-4799-2534-6 [retrieved on Jan. 3, 2014] abstract paragraph [01.3]—paragraph [03.6].
(Continued)

*Primary Examiner* — Kendall Dolly
(74) *Attorney, Agent, or Firm* — Brian J. Colandreo; Michael T. Abramson; Holland & Knight LLP

(57) ABSTRACT

A method, computer program product, and computer system for obtaining, by a computing device, a file, wherein the file includes a plurality of portions. A first hash of a first portion of the plurality of portions may be generated. The first portion may be combined with a second portion of the plurality of portions. A second hash of the first portion with the second portion of the plurality of portions may be generated, wherein the first hash may be indicative of a first level of functional similarity between a function of the file and a function of a second file, wherein the second hash may be indicative of a second level of functional similarity with the function of the file and the function of the second file.

21 Claims, 9 Drawing Sheets

(51) Int. Cl.
  *G06F 17/30* (2006.01)
  *G06F 21/56* (2013.01)

(56) References Cited

U.S. PATENT DOCUMENTS 9,202,050 B1 * 12/2015 Nachenberg ............ G06F 21/56
2017/0193230 A1 * 7/2017 Jevnisek ............... G06F 21/565

OTHER PUBLICATIONS

Jiyoung Jang, et al. : "BitShred", Computer and Communications Security, ACM, 2 Penn Plaza, Suite 701, New York, NY 10121-0701 USA, Oct. 17, 2011 (Oct. 17, 2011), pp. 309-320, XP058006061, DOI: 10.1145/2046707.2046742 ISBN: 978-1-4503-0948-6 paragraph [0001]—paragraph [03.1], paragraph [05.1]—paragraph [0007]. International Search Report issued in counterpart International Application No. PCT/EP2015/078716 dated Apr. 1, 2016.

* cited by examiner

700

```
if (analyzer_p->header().get_processor() != sdk::host_unknown_k)
{
    address_list_t address_list;
    boost::uint32_t opcode_count = opcode_limit_k;

while (opcode_count-- != 0)
    {
        if (!find_address(address_list, address))
        {
            sdk::instruction_t instruction;

if (analyzer_p->disassemble(address, sdk::address_is_relative_k, instruction))
            {
                sdk::intel::instruction_t& intel = instruction.intel;

address_list.insert(address);
                address += instruction.intel.length;

if (intel.opcode != sdk::intel::op_nop_k)
                {
                    digest_instruction(instruction.intel);

if ((intel.branch.type & sdk::intel::branch_return_k)
                        || (intel.branch.type & sdk::intel::branch_condition_k))
                    {
                        break;
                    }
                    else if (intel.branch.type & sdk::intel::branch_static_k)
                    {
                        address = analyzer_p->header().get_relative_address(intel.branch.target);

if (!analyzer_p->header().is_address_within_image_bounds(address))
                        {
                            return false;
                        }
                    }
                    else if (intel.branch.type != sdk::intel::branch_never_k)
                    {
                        break;
                    }
                }
            }
            else
            {
                return false;
            }
        }
        else
        {
            break;
        }
    }
}
```

SYSTEM AND METHOD FOR FAST AND SCALABLE FUNCTIONAL FILE CORRELATION

RELATED CASES

This application claims the benefit of U.S. Provisional Application No. 62/088,119, filed on 5 Dec. 2014, by Tomislav Pericin, entitled Fast and Scalable Functional File Correlation, the contents of which are all incorporated by reference.

BACKGROUND

Traditional file hashing algorithms may be designed to sum all the bits of a selected file into a unique number, which may represent the file content. There are many algorithms of this type and the results they produce for the same file content may be deterministic. Generally, the resulting hash digest does not change unless one or more bits of the file change as well. Thus, this approach may be useful for ensuring that the file content has not changed, e.g., since the last time it was used or transmitted. While traditional file hashing algorithms may be useful for keeping track of changes to files, they may not be as useful for identifying and/or grouping similar (but different) files together.

BRIEF SUMMARY OF DISCLOSURE

In one example implementation, a method, performed by one or more computing devices, may include but is not limited to obtaining, by a computing device, a file, wherein the file includes a plurality of portions. A first hash of a first portion of the plurality of portions may be generated. The first portion may be combined with a second portion of the plurality of portions. A second hash of the first portion with the second portion of the plurality of portions may be generated, wherein the first hash may be indicative of a first level of functional similarity between a function of the file and a function of a second file, wherein the second hash may be indicative of a second level of functional similarity with the function of the file and the function of the second file.

One or more of the following example features may be included. The first portion may be combined with the second portion and with a third portion of the plurality of portions. A third hash of the first portion, with the second portion, and with the third portion of the plurality of portions may be generated, wherein the third hash may be indicative of a third level of functional similarity between the function of the file and the function of the second file. The first portion may be combined with the second portion, with the third portion, and with a fourth portion of the plurality of portions. A fourth hash of the first portion, with the second portion, with the third portion, and with the fourth portion of the plurality of portions may be generated, wherein the fourth hash may be indicative of a fourth level of functional similarity between the function of the file and the function of the second file. Each portion of the plurality of portions may include a different functional file feature of the file. The different functional file feature of the file may include one or more of a first set of functions used by the file, a second set of functions provided by the file, relationships with at least one of the first and second sets of functions, file header information of the file, and file content layout of the file. The first level of functional similarity may be 25%, the second level of functional similarity may be 50%, the third level of functional similarity may be 75%, and the fourth level of functional similarity may be 100%. The first hash and the second hash may be generated using a functional hashing algorithm. An order of generating each hash may be identical.

In another example implementation, a computing system includes a processor and a memory configured to perform operations that may include but are not limited to obtaining a file, wherein the file includes a plurality of portions. A first hash of a first portion of the plurality of portions may be generated. The first portion may be combined with a second portion of the plurality of portions. A second hash of the first portion with the second portion of the plurality of portions may be generated, wherein the first hash may be indicative of a first level of functional similarity between a function of the file and a function of a second file, wherein the second hash may be indicative of a second level of functional similarity with the function of the file and the function of the second file.

One or more of the following example features may be included. The first portion may be combined with the second portion and with a third portion of the plurality of portions. A third hash of the first portion, with the second portion, and with the third portion of the plurality of portions may be generated, wherein the third hash may be indicative of a third level of functional similarity between the function of the file and the function of the second file. The first portion may be combined with the second portion, with the third portion, and with a fourth portion of the plurality of portions. A fourth hash of the first portion, with the second portion, with the third portion, and with the fourth portion of the plurality of portions may be generated, wherein the fourth hash may be indicative of a fourth level of functional similarity between the function of the file and the function of the second file. Each portion of the plurality of portions may include a different functional file feature of the file. The different functional file feature of the file may include one or more of a first set of functions used by the file, a second set of functions provided by the file, relationships with at least one of the first and second sets of functions, file header information of the file, and file content layout of the file. The first level of functional similarity may be 25%, the second level of functional similarity may be 50%, the third level of functional similarity may be 75%, and the fourth level of functional similarity may be 100%. The first hash and the second hash may be generated using a functional hashing algorithm. An order of generating each hash may be identical.

In another example implementation, a computer program product resides on a computer readable storage medium that has a plurality of instructions stored on it. When executed by a processor, the instructions cause the processor to perform operations that may include but are not limited to obtaining a file, wherein the file includes a plurality of portions. A first hash of a first portion of the plurality of portions may be generated. The first portion may be combined with a second portion of the plurality of portions. A second hash of the first portion with the second portion of the plurality of portions may be generated, wherein the first hash may be indicative of a first level of functional similarity between a function of the file and a function of a second file, wherein the second hash may be indicative of a second level of functional similarity with the function of the file and the function of the second file.

One or more of the following example features may be included. The first portion may be combined with the second portion and with a third portion of the plurality of portions. A third hash of the first portion, with the second portion, and with the third portion of the plurality of portions may be generated, wherein the third hash may be indicative of a third level of functional similarity between the function of the file and the function of the second file. The first portion may be combined with the second portion, with the third portion, and with a fourth portion of the plurality of portions. A fourth hash of the first portion, with the second portion, with the third portion, and with the fourth portion of the plurality of portions may be generated, wherein the fourth hash may be indicative of a fourth level of functional similarity between the function of the file and the function of the second file. Each portion of the plurality of portions may include a different functional file feature of the file. The different functional file feature of the file may include one or more of a first set of functions used by the file, a second set of functions provided by the file, relationships with at least one of the first and second sets of functions, file header information of the file, and file content layout of the file. The first level of functional similarity may be 25%, the second level of functional similarity may be 50%, the third level of functional similarity may be 75%, and the fourth level of functional similarity may be 100%. The first hash and the second hash may be generated using a functional hashing algorithm. An order of generating each hash may be identical.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 7 is an example diagrammatic view of pseudo code according to one or more example implementations of the disclosure;

Like reference symbols in the various drawings indicate like elements.

DETAILED DESCRIPTION

System Overview

Figure 1:
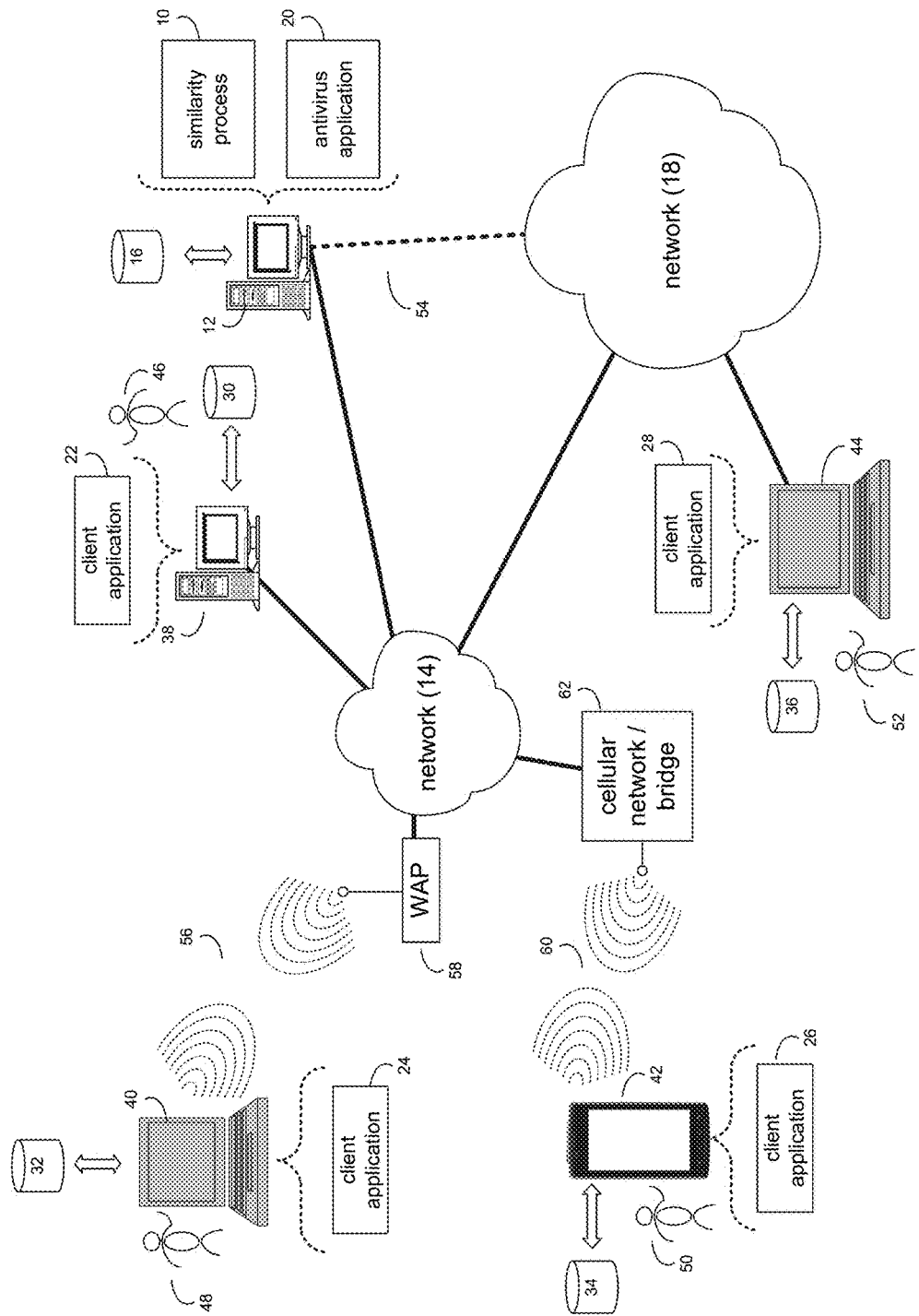
FIG. 1 is an example diagrammatic view of a similarity process coupled to a distributed computing network according to one or more example implementations of the disclosure.

As will be discussed in greater detail below, in some implementations, a hashing algorithm used with the present disclosure may be a functional hashing algorithm specifically designed to correlate files into groups based on functional file features. These features may include, e.g., file characteristics, such as format specific header information, file layouts and functional file information like code and data relationships. The number of data points used and the way the data points are selected may enable creation of multiple hashes for each file. These hashes may be used, e.g., as a guarantee of a certain level of functional similarity between files. The levels of functional similarity may be referred to as precision levels. In some implementations, every format supported by the functional hashing algorithm may come with four different precision levels that may guarantee functional similarity matches ranging from, e.g., 25% to a 100% in 25% increments.

The functional hashing algorithm may be universal in nature, which may make these hashes applicable to any executable file format (or any other type of file). As will be discussed in greater detail below, to achieve this effect, different features of the specific file format may be abstracted into categories such as: structure, layout, content, symbols, functionality and relationships. Each category may be then divided by precision levels into specific implementations that digest the file data in a specific way. Implementations may vary from format to format but may commonly be represented by ways of data sorting and simplification. These operations, at different precision levels, may ensure that different files (with different content) that may be thought of as functionally related fall into the same functional hash group. Each precision level's hash may be deterministic and may be tied to that functional hash configuration. This in turn may generate distinct precision levels with (little or) no overlaps in hash lookup. In the example, it may be the hash determinism that may enable the fastest possible hash lookup times.

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGA), micro-controller units (MCUs), or programmable logic arrays (PLA) may execute the computer readable program instructions/code by utilizing state information of the computer readable program instructions to personalize the electronic circuitry, in order to perform aspects of the present disclosure.

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to FIG. 1, there is shown similarity process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, similarity process 10 may obtain, by a computing device, a file, wherein the file includes a plurality of portions. A first hash of a first portion of the plurality of portions may be generated. The first portion may be combined with a second portion of the plurality of portions. A second hash of the first portion with the second portion of the plurality of portions may be generated, wherein the first hash may be indicative of a first level of functional similarity between a function of the file and a function of a second file, wherein the second hash may be indicative of a second level of functional similarity with the function of the file and the function of the second file.

The instruction sets and subroutines of similarity process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. Similarity process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute an antivirus application (e.g., antivirus application 20), examples of which may include, but are not limited to, e.g., an antivirus/malware application, or other application that may benefit from the ability to identify and/or group similar files together (e.g., based upon the functional similarity of the files). As such, the use of an antivirus application should be taken as an example only and not to otherwise limit the scope of the disclosure. Similarity process 10 and/or antivirus application 20 may be accessed via client applications 22, 24, 26, 28. Similarity process 10 may be a standalone application, or may be an applet/application/script/extension that may interact with and/or be executed within antivirus application 20, a component of antivirus application 20, and/or one or more of client applications 22, 24, 26, 28. Antivirus application 20 may be a standalone application, or may be an applet/application/script/extension that may interact with and/or be executed within similarity process 10, a component of similarity process 10, and/or one or more of client applications 22, 24, 26, 28. One or more of client applications 22, 24, 26, 28 may be a standalone application, or may be an applet/application/script/extension that may interact with and/or be executed within and/or be a component of similarity process 10 and/or antivirus application 20. Examples of client applications 22, 24, 26, 28 may include, but are not limited to, e.g., an antivirus/malware application, or other application that may benefit from the ability to identify and/or group similar files together (e.g., based upon the functional similarity of the files), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android', Apple® iOS®, Mac® OS X®; Red Hat® Linux®, or a custom operating system.

One or more of client applications 22, 24, 26, 28 may be configured to effectuate some or all of the functionality of similarity process 10 (and vice versa). Accordingly, similarity process 10 may be a purely server-side application, a purely client-side application, or a hybrid server-side/client-side application that is cooperatively executed by one or more of client applications 22, 24, 26, 28 and/or similarity process 10.

One or more of client applications 22, 24, 26, 28 may be configured to effectuate some or all of the functionality of antivirus application 20 (and vice versa). Accordingly, antivirus application 20 may be a purely server-side application, a purely client-side application, or a hybrid server-side/client-side application that is cooperatively executed by one or more of client applications 22, 24, 26, 28 and/or antivirus application 20. As one or more of client applications 22, 24, 26, 28, similarity process 10, and antivirus application 20, taken singly or in any combination, may effectuate some or all of the same functionality, any description of effectuating such functionality via one or more of client applications 22, 24, 26, 28, similarity process 10, antivirus application 20, or combination thereof, and any described interaction(s) between one or more of client applications 22, 24, 26, 28, similarity process 10, antivirus application 20, or combination thereof to effectuate such functionality, should be taken as an example only and not to limit the scope of the disclosure.

Users 46, 48, 50, 52 may access computer 12 and similarity process 10 (e.g., using one or more of client electronic devices 38, 40, 42, 44) directly through network 14 or through secondary network 18. Further, computer 12 may be connected to network 14 through secondary network 18, as illustrated with phantom link line 54. Similarity process 10 may include one or more user interfaces, such as browsers and textual or graphical user interfaces, through which users 46, 48, 50, 52 may access similarity process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
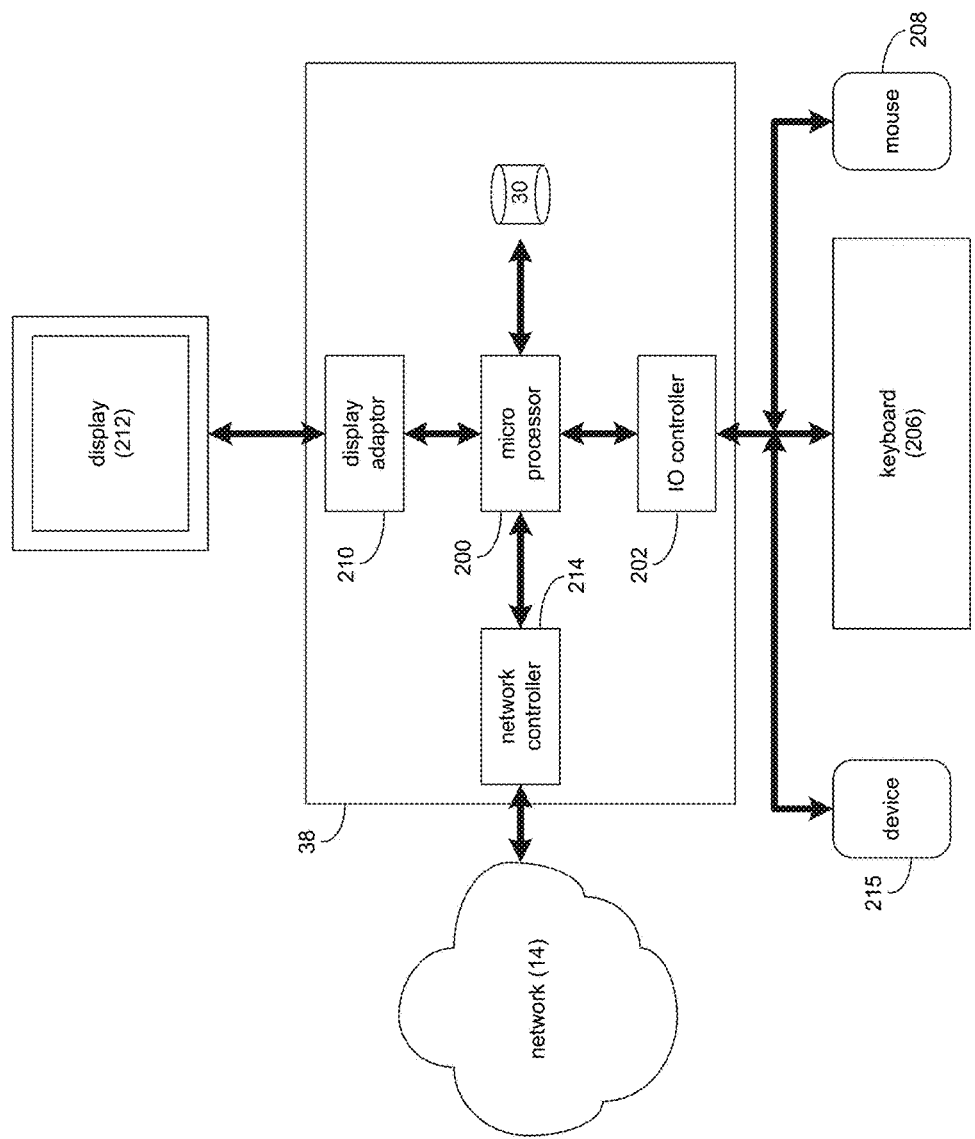
FIG. 2 is an example diagrammatic view of a client electronic device of FIG. 1 according to one or more example implementations of the disclosure.
Figure 3:
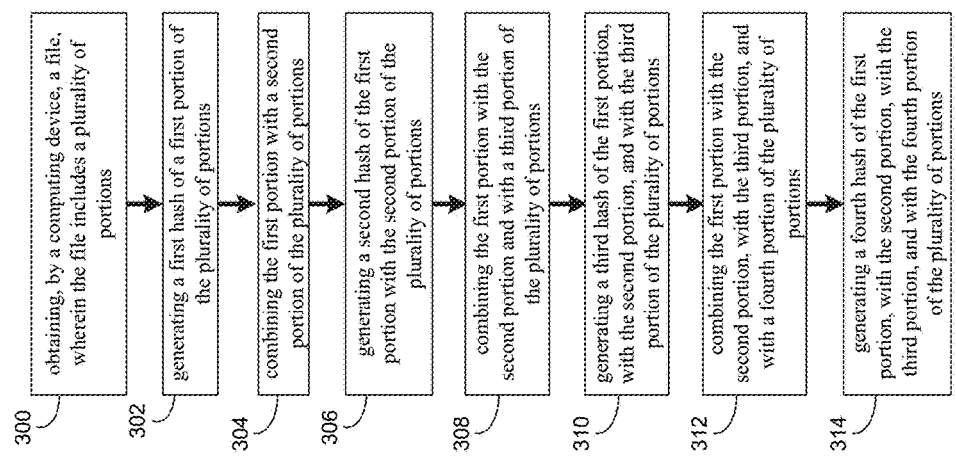
FIG. 3 is an example flowchart of the similarity process of FIG. 1 according to one or more example implementations of the disclosure.

Referring also to FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, similarity process 10 may be substituted for client electronic device 38 (in whole or in part) within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

The Similarity Process:

As discussed above and referring also at least to FIGS. 3-9, similarity process (SP) 10 may obtain 300 a file, wherein the file includes a plurality of portions. A first hash of a first portion of the plurality of portions may be generated 302 by SP 10. The first portion may be combined 304 by SP 10 with a second portion of the plurality of portions. A second hash of the first portion with the second portion of the plurality of portions may be generated 306 by SP 10, wherein the first hash may be indicative of a first level of functional similarity between a function of the file and a function of a second file, wherein the second hash may be indicative of a second level of functional similarity with the function of the file and the function of the second file.

As noted above, traditional file hashing algorithms may be designed to sum all the bits of a selected file into a unique number, which may represent the file content. There are many algorithms of this type and the results they produce for the same file content may be deterministic. Generally, the resulting hash digest does not change unless one or more bits of the file change as well. Thus, this approach may be useful for ensuring that the file content has not changed, e.g., since the last time it was used or transmitted, for deduplication, etc.

While traditional file hashing algorithms may be useful for keeping track of changes to files, they may not be as useful for identifying and/or grouping similar (but different) files together. In some implementations, these kinds of algorithms may be created specifically to allow for file content variations (e.g., where the file content of two or more files differ but the same hash is generated). As will be discussed in greater detail, the main feature around which the files may be grouped together may be their functionality.

In some implementations, similarity process (SP) 10 may obtain 300 a file, wherein the file includes a plurality of portions. For instance, and referring at least to FIG. 4, SP process 10 may obtain 300 a file (e.g., file 400) from a data store, local storage device, or otherwise. As noted above, the main feature around which the files may be grouped together may be their functionality. In some implementations, the functionality may be broadly defined as a set of one or more features of the executable file (e.g., file 400) needed to perform its operation. This may include but is not limited to the set of functions used by the applications, the set of functions provided by the applications, the functions themselves with their relationships, general file header information and the file content layout. Example features 402 for file 400 are shown for example purposes only. It will be appreciated that various other features, fields, etc. may be used without departing from the scope of the disclosure.

In some implementations, a first hash of a first portion of the plurality of portions may be generated 302 by SP 10. For example, file 400 may include a plurality of portions, which may represent, e.g., fields and the content within those fields (or other features 402). For instance, the first portion may include the features of, e.g., Machine field, Characteristics field, Entry point address, Subsystem field, Export table content, Import table content, Delay import table content, TLS table content, and Finalization. In the example, SP 10 may generate 302 a hash of the first portion. In some implementations, the first hash may be generated using a functional hashing algorithm. In some implementations, the functional file hashing algorithm used by SP 10 may be designed to selectively traverse executable files (or other file types) and collect information about, e.g., their headers, content layouts and code in order to create a unique data model by which the features may be converted by SP 10 from complex structures into a hash digest. In some implementations, data within this model may be preprocessed by SP 10 based upon the selected feature type. In some implementations, this preprocessing may be done the same way for the feature, which may ensure that similar files are grouped together even if there are some differences between them (e.g., feature ordering or slight variations in certain numerical values/content, etc.).

In some implementations, these kinds of algorithms, due to their nature, may have to be explicitly defined for each supported executable format type. This may be accomplished via a user interface associated with SP 10. Due to the way the hashing is done, there may not be a guarantee that there will not be any collisions between different executable formats. It will be appreciated that while the disclosure involves a portable executable file format with a functional file hashing algorithm, other types of files (e.g., executable file formats or otherwise) and/or other types of hashing algorithms may be used without departing from the scope of the disclosure. In some implementations, regardless of the executable file format, the methodology in which the functional file hashing may be implemented by SP 10 may remain the same.

Figure 4:
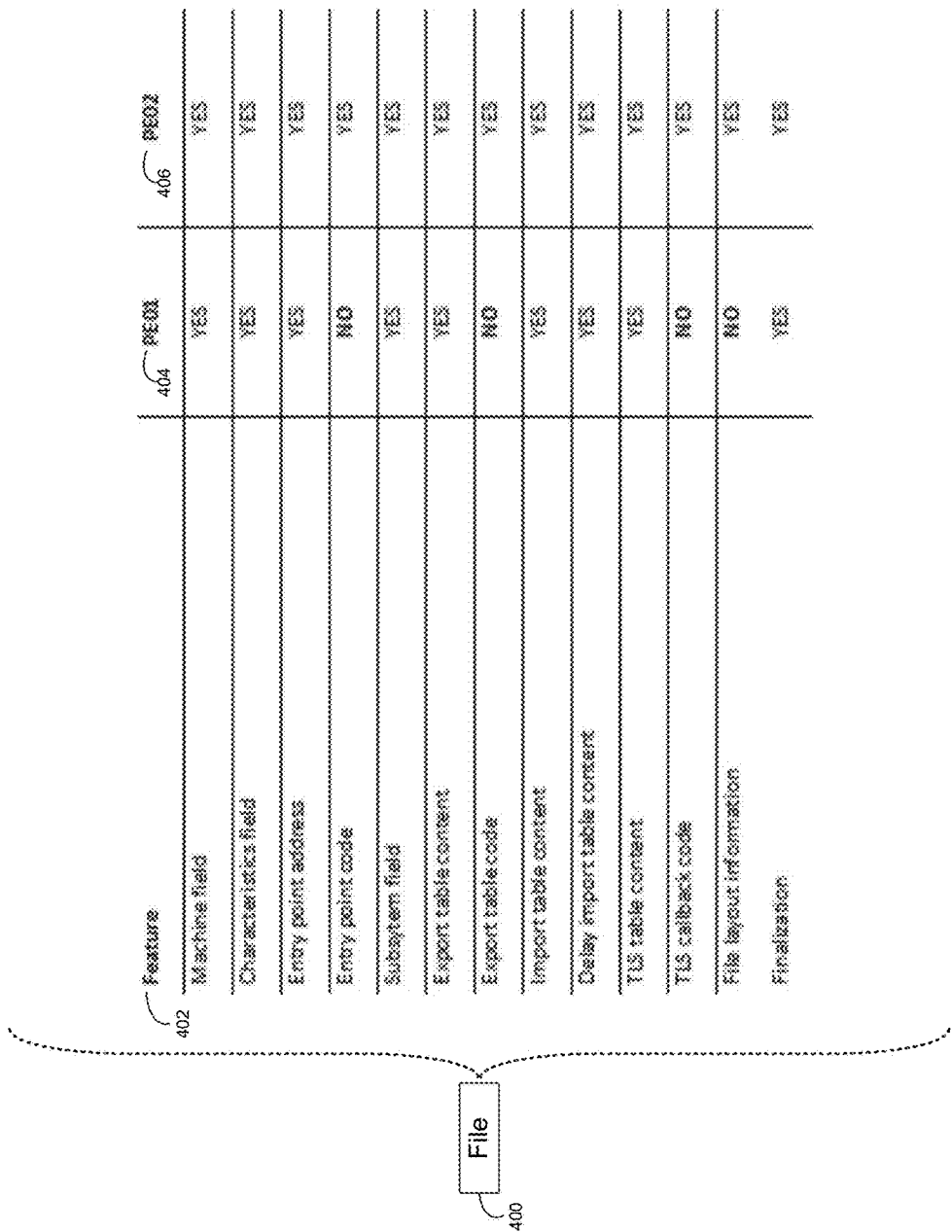
FIG. 4 is an example diagrammatic view of file features according to one or more example implementations of the disclosure.
Figure 5:
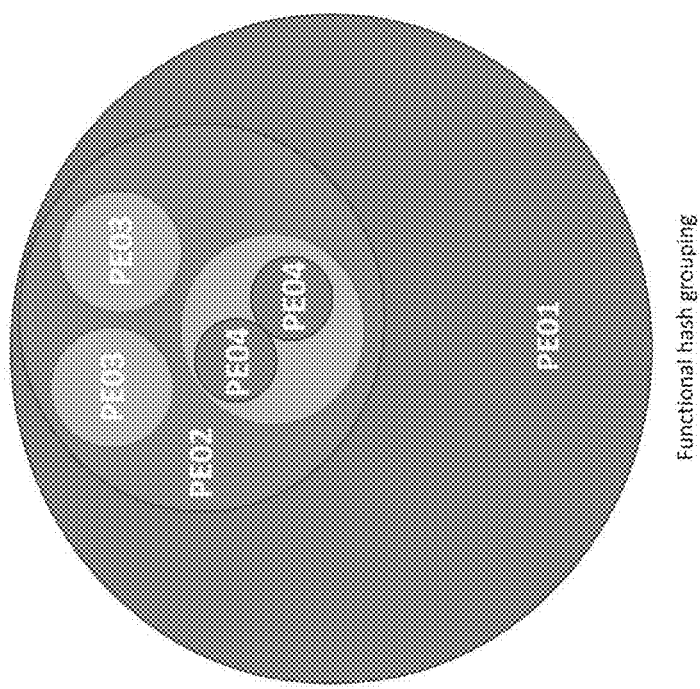
FIG. 5 is an example diagrammatic view of functional hash grouping according to one or more example implementations of the disclosure.

In some implementations, data preparation and separation by SP 10 into functional groups may enable the flexibility to create hashes by the necessary precision or by the desired features. For instance, a level of functional similarity or precision levels between different files may be generally defined as a minimum set of features that when hashed together by SP 10 may produce a deterministic result that different files share. In some implementations, each portion of the plurality of portions may include a different functional file feature of the file; however, in some implementations, to help ensure that many precision levels may be defined, the next precision level may always include the entire content of the previous one. For example, in some implementations, the first portion may be combined 304 by SP 10 with a second portion of the plurality of portions. For instance, as shown in FIG. 4, the first portion (e.g., Machine field, Characteristics field, Entry point address, Subsystem field, Export table content, Import table content, Delay import table content, TLS table content, and Finalization) may be combined 304 with a second portion of file 400 (e.g., Entry point code, Export table code, TLS callback code, and File layout information). Thus, in the example, when combined 304, the result is the entire content of the first portion (e.g., Machine field, Characteristics field, Entry point address, Subsystem field, Export table content, Import table content, Delay import table content, TLS table content, and Finalization) plus the additional second portion (e.g., Entry point code, Export table code, TLS callback code, and File layout information).

In some implementations, a second hash of the first portion with the second portion of the plurality of portions may be generated 306 by SP 10. Thus, in the example, SP process 10 may generate 306 a hash of (e.g., Machine field, Characteristics field, Entry point address, Entry point code, Subsystem field, Export table content, Export table code, Import table content, Delay import table content, TLS table content, TLS callback code, File layout information, and Finalization). As noted above, different functional file feature of the file may include one or more of a first set of functions used by the file, a second set of functions provided by the file, relationships with at least one of the first and second sets of functions, file header information of the file, and file content layout of the file.

In some implementations, the first hash may be indicative of a first level of functional similarity between a function of the file and a function of a second file, wherein the second hash may be indicative of a second level of functional similarity with the function of the file and the function of the second file. For example, this may place different files from the traditional file perspective into the same group from the functional file hashing perspective, where different precision levels may enable finer granularity into functional file grouping. Thus, the lowest precision hash (e.g., the first hash with the least number of hashed features) may provide the most results within a selected data set of other file hashes created by SP 10 using the same functional hashing algorithm for the same features of the data set. An example of the features used for the lowest precision hash is shown at first level feature hash list 404 in FIG. 4. An example of the features used for the next level precision hash is shown at second level feature hash list 406 in FIG. 4. While increasing the precision may reduce the number of files that are determined to be similar to each other, those files' respective functional similarity levels may increase. An example of this may be seen from FIG. 5, which illustrates an example similarity chart 500 using four different levels of functional similarity (e.g., PE01, PE02, PE03, and PE04). It will be appreciated that any number of levels may be used without departing from the scope of the disclosure.

Both lower and higher precision levels may be useful for file analysis. Properties of any precision level may be declared as sufficient for external logic that may, among other things, perform file classification based upon this hash. In some implementations, classification may be assigned by SP 10 to the functional group only if the set of criteria for that classification is matched. This criteria may be set (via SP 10) outside the scope of the functional file similarity. Experiments with these kinds of classifications may show that classification may be completed even with the lowest precision level if the criteria for that kind of classification is strict. This may limit the classification only to groups that may be known by SP 10 to contain a significant amount of malicious files exclusively.

In some implementations, portable executable file format may be a predominantly Microsoft® Windows® operating system centered file format. In the example, its structures and content may be specific to that platform and the functionality of the compiled executable file. In some implementations, as noted above, various functional features observed within this file format for the purposes of creating the functional file hash, may include, e.g., header constants, import functions, export functions, TLS callbacks, data table layouts, selected entry point assembly code, and functional call graph with its properties. It will be appreciated that other operating systems may be used in accordance with their key functional features observed with the appropriate file format without departing from the scope of the disclosure. In some implementations, alongside the features themselves, their parsing and data preparation may be key for creating the above-noted functional hash. The preparation for this file format may include, e.g., numerical rounding, table data merging, string sorting, layout optimization, reference normalization, code analysis, dead and junk code elimination, as well as other preparations.

As will be discussed in greater detail below, more than two levels of functional similarity grouping may be used. For example, four functional similarity groups may be used. In some implementations, the first level of functional similarity may be 25%, the second level of functional similarity may be 50%, the third level of functional similarity may be 75%, and the fourth level of functional similarity may be 100%. In some implementations, depending on the precision level, one or more of the listed features may be used to generate the above-noted functional file hash. As noted above, the number of optimal precision levels for the portable execution file format may be four. In the example, each of these precision levels may represent the increase in functional similarity by 25%. Names of the functional similarity groups in the example are: PE01 (25%), PE02 (50%), PE03 (75%) and PE04 (100%). The functional file hash string may be represented as the precision level group and its content hash in this example and non-limiting format: pe0x-hash of the group content, where x goes from 0 to 4. It will be appreciated that more or less levels of precision and other intervals of increased functional similarity may also be used without departing from the scope of the disclosure. As noted above, the selected hashing algorithm that is applied by SP 10 over the data file may vary, however, the SHA1 may have beneficial speed and length properties.

In some implementations, the second hash may be generated using a functional hashing algorithm. In some implementations, the second precision level for the portable executable format (e.g., second level of functional similarity) may consist of the following example portable executable file format parsing and data preparation actions performed by SP 10:

Portable executable machine field may be retrieved and hashed by SP 10.

Portable executable (pe) header characteristics field may be retrieved by SP 10. In some implementations, only the following bits, whose values may be defined by the portable executable format specification for that field, may be used:
pe::image_file_executable_image_k
pe::image_file_system_k
pe::image_file_dll_k Portable executable address of entry point may be retrieved by SP 10. In some implementations, its value may be rounded down to the closest page and hashed by SP 10. As will be described in greater detail below, the assembly content of the original entry point may be hashed by SP 10 in this step as well.

Portable executable subsystem field may be retrieved and hashed by SP 10.

Portable executable export table may be parsed and its content hashed by SP 10. In some implementations, the exported functions may be sorted alphabetically and their code hashed with the same procedure as the entry point. In some implementations, if the data table contains invalid entries, the valid ones may be hashed and the value of the data table index may be added to the hash bit stream by SP 10.

Portable executable import table may be parsed and its content may be queued for hashing by SP 10. Import table information may be sorted alphabetically by SP 10. Data deduplication may be used so only one library with its functions is registered for hashing. In some implementations, if the data table contains invalid entries, the valid ones may be hashed and the value of the data table index may be added to the hash bit stream by SP 10.

Portable executable delay import table may be parsed and its content may be queued for hashing by SP 10. Delay import table information may be merged with import table data by SP 10. Data deduplication may be used so only one library with its functions is registered for hashing. In some implementations, if the data table contains invalid entries, the valid ones may be hashed and the value of the data table index may be added to the hash bit stream by SP 10.

Portable executable TLS table may be parsed and its callback addresses may be converted to relative virtual addresses, rounded down, and hashed by SP 10. Callback code may be hashed with the same procedure as the entry point and the export functions. In some implementations, if the data table contains invalid entries, the valid ones may be hashed and the value of the data table index may be added to the hash bit stream by SP 10.

Figure 6:
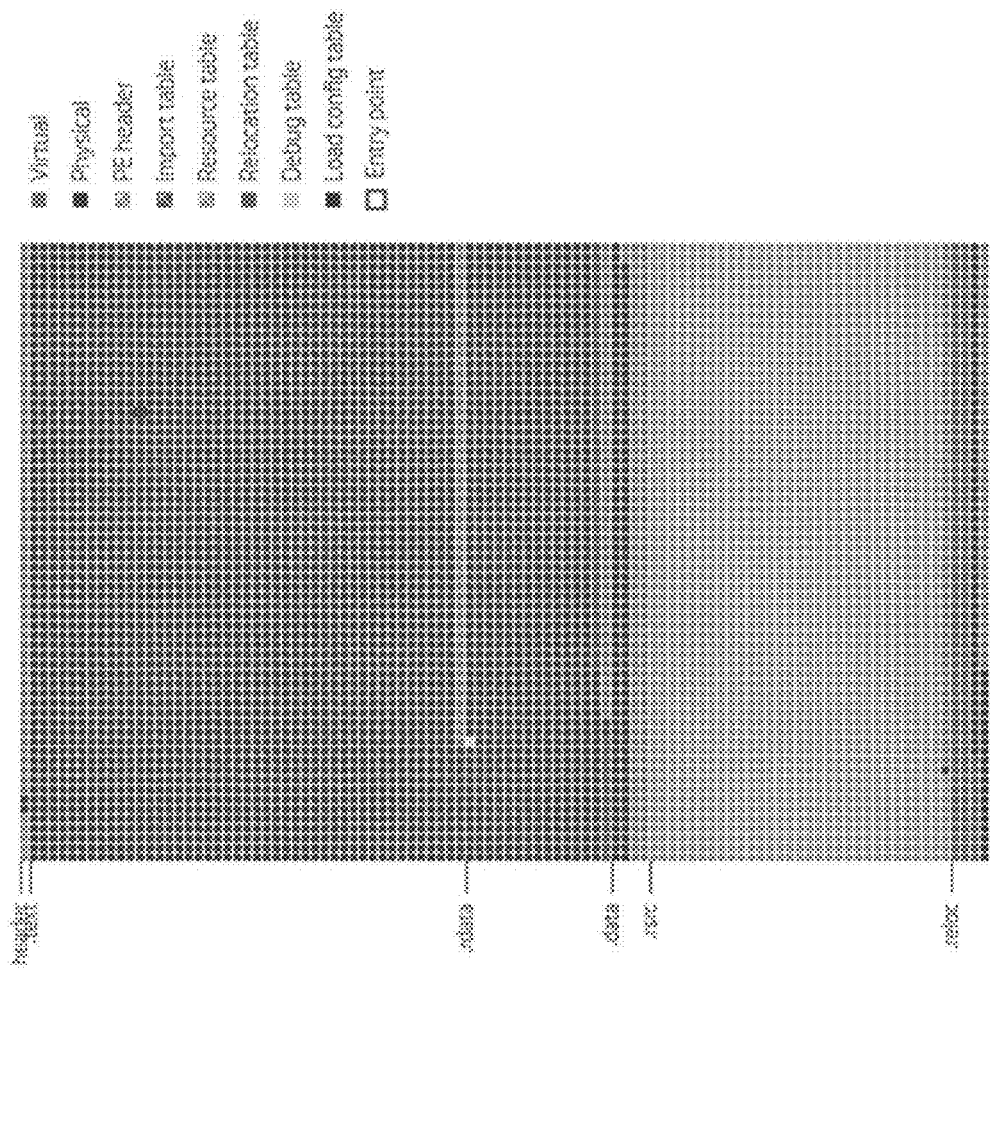
FIG. 6 is an example diagrammatic view of structural file visualization according to one or more example implementations of the disclosure.
Figure 8:
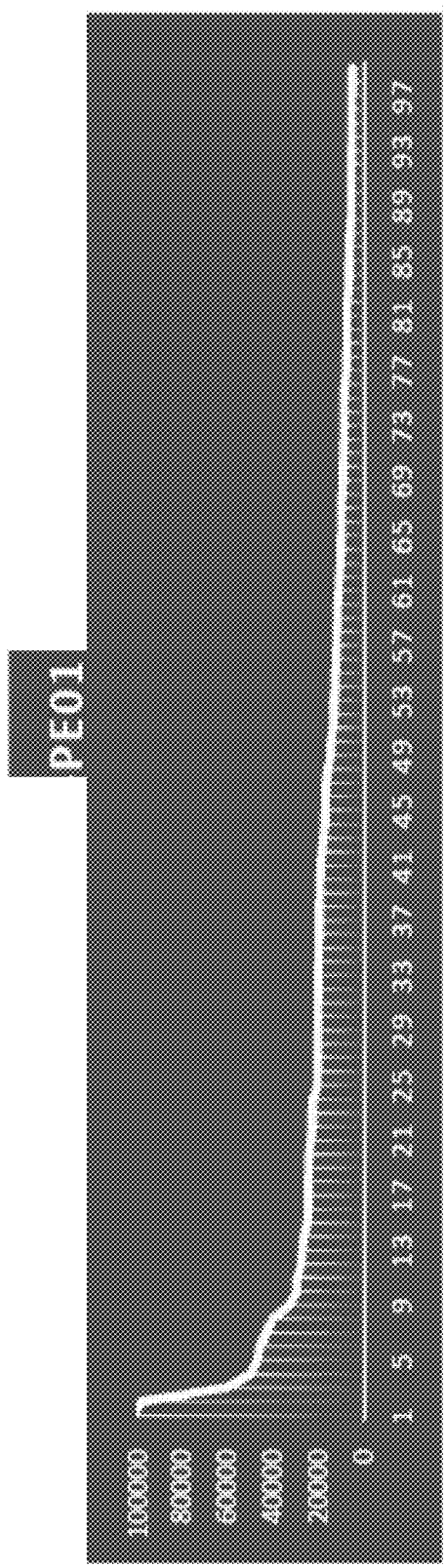
FIG. 8 is an example diagrammatic view of a plot of unique binaries according to one or more example implementations of the disclosure.
Figure 9:
FIG. 9 is an example diagrammatic view of a graph of normalized threat names according to one or more example implementations of the disclosure.

In some implementations, at least a portion (or the entirety) of portable executable file may be analyzed and its data table locations may be used to create region information that may be normalized and hashed by SP 10. An example visual representation 600 of this process is shown at FIG. 6.

The functional hash may be finalized with the addition of the merged import information to the hash bit stream by SP 10.

As noted above and shown at FIG. 4, the difference between the first and second precision level is represented by the fields and the content within those fields which is hashed, noted by first level feature hash list 404 second level feature hash list 406. It will be appreciated that more or less fields may be added to/removed from the hash at a later date to improve/decrease the precision provided by the functional similarity hashing level.

In some implementations, basic code analysis may be performed by SP 10 against all portable executable format entry points. Those entry points may be covered by, e.g., the entry point address, exported functions, and TLS callbacks. The code represented by these functions may be analyzed and used by SP 10 to get data whose hashing updates the functional file digest.

In some implementations, since portable executable file format may support many different processor architectures, a code analyzer for each of them may be developed individually. The general analysis approach may be the same for all architectures, but the example and non-limiting pseudo code 700 shown in FIG. 7 may refer to Intel® processor architecture.

In some implementations, code analysis performed by SP 10 may be a linear sweep disassembly operation that tracks addresses analyzed and follows the non-conditional code branches until a termination condition has been found. Some example conditions that may be considered as the termination condition may include, e.g., address to be analyzed has been seen before (prevents looping), branch condition is either conditional or final (return from function), number of analyzed opcodes reaches predefined maximum (limits analysis depth).

In some implementations, all instructions, except the non-operation instructions, may be used by SP 10 to update the functional file digest. In some implementations, the whole instruction, however, may not be used to update the digest. For example, the parts that may be used may be the opcode type and all of the operand types. This may indicate that the digest is updated with the integers representing the whole instruction and not the bytes from which the instruction is composed. In some implementations, instruction prefixes may be ignored unless they are crucial for the instruction operation.

As noted above, various other levels of functional similarity may be generated by SP 10. In some implementations, this may be done using similar techniques to generate the above-noted lower levels of functional similarity (e.g., first and second levels). For example, the first portion may be combined 308 by SP 10 with the second portion and with a third portion of the plurality of portions. The third portion of the plurality of portions may include additional features not included when generating the first and second functional hashes. A third hash of the first portion, with the second portion, and with the third portion of the plurality of portions may be generated 310 by SP 10, wherein the third hash may be indicative of a third level of functional similarity between the function of the file and the function of the second file. Thus, in the example, the features of the first portion, the features of the second portion, and the features of the third portion may be combined, and then hashed.

As noted above, various other levels of functional similarity may be generated by SP 10. In some implementations, this may be done using similar techniques to generate the above-noted lower levels of functional similarity (e.g., first, second, and third levels). For example, the first portion may be combined 308 by SP 10 with the second portion, with the third portion, and with a fourth portion of the plurality of portions. The fourth portion of the plurality of portions may include additional features not included when generating the first, second, and third functional hashes. A fourth hash of the first portion, with the second portion, with the third portion, and with the fourth portion of the plurality of portions may be generated 314 by SP 10, wherein the fourth hash may be indicative of a fourth level of functional similarity between the function of the file and the function of the second file. Thus, in the example, the features of the first portion, the features of the second portion, the features of the third portion, and the features of the fourth portion may be combined, and then hashed.

In some implementations, the fourth precision level for the portable executable format may depend on the code flow analysis of the entire application by SP 10. For example, in the preparation step, basic function blocks may be detected and organized into functions by SP 10. The following example functional file hash preparation for the code flow data may be performed by SP 10:

Basic function blocks may be hashed individually by SP 10. The same instruction hashing principle as described in the assembly code analysis section may be used. In some implementations, these hashes may not be used to update the functional file digest.

Basic function blocks within a function may be organized and sorted by their digest values by SP 10. Appended to every block, the list of basic block relationships may be provided by SP 10. These relationships may be numbered by SP 10 within the basic block and may be independent of the addresses on which the code is located.

Functions may be organized and sorted by their digest values by SP 10. The function digest value may be computed by SP 10 from the digest of the basic block hashes. Appended to every function, the list of function relationships may be provided by SP 10. These relationships may be numbered by SP 10 within the application and may be independent of the addresses on which the code is located.

In some implementations, an order of generating each hash may be identical. For instance, when generating 306 the second hash, the selected functions may be hashed in the preprocessed order (e.g., Machine field, Characteristics field, Entry point address, Subsystem field, Export table content, Import table content, Delay import table content, TLS table content, Finalization, Entry point code, Export table code, TLS callback code, and File layout information). In some implementations, once the data is prepared for function file hashing, the operation performed by SP 10 may be a digest of all of the selected functions in the preprocessed order. In some implementations, function selection may be a key difference between precision levels three and four. For example, the third precision level may function filtering based upon criteria, such as function importance, while the fourth precision level may not do any kind of function filtering, as the fourth precision level may cover the whole file and all of its functional features.

In some implementations, file compilation may be a translation from the original source code to a binary portable executable object that may be reinterpreted by the operating system upon request to load or execute the file. Any number of programming languages may produce their output in the portable executable file format for the Windows® operating system. In some implementations, the programming language itself may influence the functions imported by SP 10, the code itself, and layout of the file. Each of these may influence the functional file hash. As such, in some implementations, if the original source code is compiled with two different compilers, or even different compiler options, the resulting functional hashes against these files may differ. In some implementations, the lowest precision level (e.g., first level of functional similarity) may be best to mitigate this problem while not completely reducing its effects.

The effectiveness of SP 10 may be described in an example using malware. For instance, assume for example purposes only that the above-noted process is tested over a sample set of around 7.75M unique malware binaries for which at least one antivirus vendor claims that the file was a part of the Zeus malware family. After SP 10 processes the samples with the above-noted algorithm, SP 10 may be able to distinguish around 475 k unique hashes at the lowest precision point. This may effectively reduce the working malware set size by around 93%.

This reduction in sample uniqueness for the members of the same malware family may be noticeable, but the overall reduction numbers may appear to be much better than what may be expected. To help understand why the effectiveness of the hashing algorithm was so high, analysis of the sample data may be performed. In the example, and referring at least to FIG. 8, an example plot 800 is shown. The starting point may be the best hashes that yielded the top matching results. The plot 800 may show the number of unique binaries that map to a single hash at the lowest precision.

In some implementations, the top matching hash file samples may show that the best match may not be over any particular malware family itself, but a packing wrapper that may be used to mask the true attack. The packing layer in question may not be a common off the shelf packer, such as UPX, but instead may be a custom packing solution developed exclusively to hide malware presence. In the example, since packing may obscure detections and their malware family groupings, the antivirus solutions were reviewed to see how they were classifying the top match. In the example, and referring at least to FIG. 9, an example graph 900 is shown. Graph 900 may show the normalized threat names for the 100 k files of the best hash.

In some implementations, unpacking files may show that the top match may be using multiple packing layers. In the example, the number of corrupted and wrongly packed files may be low, enabling SP 10 to successfully unpack 95% of the samples. Tracking the lowest hash even across multiple layers of packing may still preserve all files within the same functional hash group.

In the example, the hash, even at the lowest precision level, may show little or no collisions with whitelisted files, and therefore may be safely applied to an automatic hash cloud classification associated with SP 10. In the example, SP 10 may blacklist the custom packer via its format signature and its lowest level hash, enabling SP 10 to detect and group multiple malware families that use the custom packer.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    obtaining, by a computing device, a file, wherein the file includes a plurality of portions;
    generating a first hash of a first portion of the plurality of portions;
    combining the first portion with a second portion of the plurality of portions;
    generating a second hash of the first portion with the second portion of the plurality of portions, wherein an order of functional file features of the plurality of portions used to generate the first hash is identical to the order of functional file features of the plurality of portions used to generate the second hash, wherein the first hash is indicative of a first level of functional similarity between a function of the file and a function of a second file, wherein the second hash is indicative of a second level of functional similarity with the function of the file and the function of the second file, wherein each level of functional similarity includes a minimum set of functional file features that when hashed together produce a deterministic result that, when compared to one of the first hash and the second hash, the file and the second file share, and wherein each level of functional similarity respectively reduces a set of unique working binaries that map to one of the first hash at the first level of functional similarity and the second hash at the second level of functional similarity to share the deterministic result; and
    grouping the file and the second file based upon, at least in part, the first level of functional similarity and the second level of functional similarity to enable granularity into functional file grouping.

2. The computer-implemented method of claim 1 further comprising:
    combining the first portion with the second portion and with a third portion of the plurality of portions; and
    generating a third hash of the first portion, with the second portion, and with the third portion of the plurality of portions, wherein the third hash is indicative of a third level of functional similarity between the function of the file and the function of the second file.

3. The computer-implemented method of claim 2 further comprising:
    combining the first portion with the second portion, with the third portion, and with a fourth portion of the plurality of portions; and
    generating a fourth hash of the first portion, with the second portion, with the third portion, and with the fourth portion of the plurality of portions, wherein the fourth hash is indicative of a fourth level of functional similarity between the function of the file and the function of the second file.

4. The computer-implemented method of claim 1 wherein each portion of the plurality of portions includes a different functional file feature of the file.

5. The computer-implemented method of claim 4 wherein the different functional file feature of the file includes one or more of a first set of functions used by the file, a second set of functions provided by the file, relationships with at least one of the first and second sets of functions, file header information of the file, and file content layout of the file.

6. The computer-implemented method of claim 3 wherein the first level of functional similarity is 25%, the second level of functional similarity is 50%, the third level of functional similarity is 75%, and the fourth level of functional similarity is 100%.

7. The computer-implemented method of claim 1 wherein the first hash and the second hash are generated using a functional hashing algorithm.

8. A computer program product residing on a non-transitory computer readable storage medium having a plurality of instructions stored thereon which, when executed by a processor, cause the processor to perform operations comprising:
    obtaining a file, wherein the file includes a plurality of portions;
    generating a first hash of a first portion of the plurality of portions;
    combining the first portion with a second portion of the plurality of portions;
    generating a second hash of the first portion with the second portion of the plurality of portions, wherein an order of functional file features of the plurality of portions used to generate the first hash is identical to the order of functional file features of the plurality of portions used to generate the second hash, wherein the first hash is indicative of a first level of functional similarity between a function of the file and a function of a second file, wherein the second hash is indicative of a second level of functional similarity with the function of the file and the function of the second file, wherein each level of functional similarity includes a minimum set of functional file features that when hashed together produce a deterministic result that, when compared to one of the first hash and the second hash, the file and the second file share, and wherein each level of functional similarity respectively reduces a set of unique working binaries that map to one of the first hash at the first level of functional similarity and the second hash at the second level of functional similarity to share the deterministic result; and grouping the file and the second file based upon, at least in part, the first level of functional similarity and the second level of functional similarity to enable granularity into functional file grouping.

9. The computer program product of claim 8 wherein the operations further comprise:

combining the first portion with the second portion and with a third portion of the plurality of portions; and generating a third hash of the first portion, with the second portion, and with the third portion of the plurality of portions, wherein the third hash is indicative of a third level of functional similarity between the function of the file and the function of the second file.

10. The computer program product of claim 9 wherein the operations further comprise:

combining the first portion with the second portion, with the third portion, and with a fourth portion of the plurality of portions; and generating a fourth hash of the first portion, with the second portion, with the third portion, and with the fourth portion of the plurality of portions, wherein the fourth hash is indicative of a fourth level of functional similarity between the function of the file and the function of the second file.

11. The computer program product of claim 8 wherein each portion of the plurality of portions includes a different functional file feature of the file.

12. The computer program product of claim 11 wherein the different functional file feature of the file includes one or more of a first set of functions used by the file, a second set of functions provided by the file, relationships with at least one of the first and second sets of functions, file header information of the file, and file content layout of the file.

13. The computer program product of claim 10 wherein the first level of functional similarity is 25%, the second level of functional similarity is 50%, the third level of functional similarity is 75%, and the fourth level of functional similarity is 100%.

14. The computer program product of claim 8 wherein the first hash and the second hash are generated using a functional hashing algorithm.

15. A computing system including a processor and a memory comprising:

the processor and the memory configured to perform operations comprising:

obtaining a file, wherein the file includes a plurality of portions;

generating a first hash of a first portion of the plurality of portions;

combining the first portion with a second portion of the plurality of portions;

generating a second hash of the first portion with the second portion of the plurality of portions, wherein an order of functional file features of the plurality of portions used to generate the first hash is identical to the order of functional file features of the plurality of portions used to generate the second hash, wherein the first hash is indicative of a first level of functional similarity between a function of the file and a function of a second file, wherein the second hash is indicative of a second level of functional similarity with the function of the file and the function of the second file, wherein each level of functional similarity includes a minimum set of functional file features that when hashed together produce a deterministic result that, when compared to one of the first hash and the second hash, the file and the second file share, and wherein each level of functional similarity respectively reduces a set of unique working binaries that map to one of the first hash at the first level of functional similarity and the second hash at the second level of functional similarity to share the deterministic result; and grouping the file and the second file based upon, at least in part, the first level of functional similarity and the second level of functional similarity to enable granularity into functional file grouping.

16. The computing system of claim 15 wherein the operations further comprise:

combining the first portion with the second portion and with a third portion of the plurality of portions; and generating a third hash of the first portion, with the second portion, and with the third portion of the plurality of portions, wherein the third hash is indicative of a third level of functional similarity between the function of the file and the function of the second file.

17. The computing system of claim 16 wherein the operations further comprise:

combining the first portion with the second portion, with the third portion, and with a fourth portion of the plurality of portions; and generating a fourth hash of the first portion, with the second portion, with the third portion, and with the fourth portion of the plurality of portions, wherein the fourth hash is indicative of a fourth level of functional similarity between the function of the file and the function of the second file.

18. The computing system of claim 15 wherein each portion of the plurality of portions includes a different functional file feature of the file.

19. The computing system of claim 18 wherein the different functional file feature of the file includes one or more of a first set of functions used by the file, a second set of functions provided by the file, relationships with at least one of the first and second sets of functions, file header information of the file, and file content layout of the file.

20. The computing system of claim 17 wherein the first level of functional similarity is 25%, the second level of functional similarity is 50%, the third level of functional similarity is 75%, and the fourth level of functional similarity is 100%.

21. The computing system of claim 15 wherein the first hash and the second hash are generated using a functional hashing algorithm.

* * * * *